US008866972B1

United States Patent
Dai et al.

(10) Patent No.: US 8,866,972 B1
(45) Date of Patent: Oct. 21, 2014

(54) METHOD FOR TRANSMITTING SPECTRUM INFORMATION

(71) Applicant: Tsinghua University, Beijing (CN)

(72) Inventors: Qionghai Dai, Beijing (CN); Chenguang Ma, Beijing (CN); Jinli Suo, Beijing (CN)

(73) Assignee: Tsinghua University (CN)

( * ) Notice: Subject to any disclaimer, the term of this patent is extended or adjusted under 35 U.S.C. 154(b) by 0 days.

(21) Appl. No.: 14/279,848

(22) Filed: May 16, 2014

(30) Foreign Application Priority Data

May 16, 2013 (CN) .......................... 2013 1 0182438

(51) Int. Cl.
*H04N 5/91* (2006.01)
*H04N 17/02* (2006.01)

(52) U.S. Cl.
CPC ...................................... *H04N 5/91* (2013.01)
USPC ........... 348/571; 348/575; 348/537; 348/539; 348/222.1; 348/180; 382/210

(58) Field of Classification Search
USPC .............. 348/571, 575, 537, 539, 222.1, 289, 348/242, 180; 382/154, 207, 210
See application file for complete search history.

(56) References Cited

U.S. PATENT DOCUMENTS 6,738,169 B1 * 5/2004 Nakase .......................... 358/539
8,335,371 B2 * 12/2012 Dai et al. ....................... 382/154

* cited by examiner

*Primary Examiner* — Jefferey Harold
*Assistant Examiner* — Jean W Desir
(74) *Attorney, Agent, or Firm* — Lerner, David, Littenberg, Krumholz & Mentlik, LLP

(57) ABSTRACT

A method for transmitting spectrum information is provided. The method includes: sampling a first video of a scene by a first sampling device and sampling a spectrum video of a sampling point in the scene by a second sampling device, and processing the spectrum video to obtain a spectrum information of the sampling point; calculating estimated transmission ratio coefficients of the spectrum video according to color integral curves of the first sampling device; estimating a location of the sampling point in each frame of the first video; and transmitting the spectrum information of the sampling point to a plurality of scene points in the first video according to the estimated transmission ratio coefficients and the location of the sampling point in each frame of the spectrum video through a trilateral filtering algorithm.

8 Claims, 2 Drawing Sheets

METHOD FOR TRANSMITTING SPECTRUM INFORMATION

CROSS-REFERENCE TO RELATED APPLICATIONS

The present application claims priority from Chinese Patent Application No. 201310182438.1 filed with State Intellectual Property Office, P.R.C. on May 16, 2013, the disclosure of which is hereby incorporated herein by reference.

FIELD

Embodiments of the present disclosure generally relate to an image processing technology field, more particularly, to a method for transmitting spectrum information.

BACKGROUND OF THE INVENTION

Although the imaging technology based on color channels meets the imaging requirements of the human vision system, spectrum information of the scene is lost during the integrating process of the scene light spectrum in the camera sensors. The lost information is the key property for reflecting the physical characteristics of the light source and the scene, and thus it is important to solve the problem of sampling the spectrum information of the scene. Starting from this, many researches on sampling the spectrum information have been performed.

The spectrum technology and the optical imaging technology are two widely used technologies. The spectrum technology mainly adopts the physical characteristics of the light (such as the dispersion and the diffraction) and the band-pass characteristics of the filter for the spectrum domain to transform a single beam of light into a plurality of light, each of which has a single spectrum. After the light is separated in the spectrum dimension, the light intensities in different spectral bands can be detected independently by the light sensor, such that the spectrum information of the detected light can be sampled. On the other hand, with the rapid development of the sensor technology, the imaging technology based on the CCD (Charge Coupled Device) electric coupler becomes mature gradually. The CCD electric coupler can directly capture the light and transform the optical signal to the analog current signal, and the image can be obtained conveniently after amplifying and analog-to-digital converting the analog current signal. Recently, researchers combine the imaging technology with the spectrum technology to sample the scene both in the spatial dimension and in the spectral dimension, thus prompting the development of the hyper spectral sampling based on the imaging technology.

The color (red, green and blue) channel intensities of each pixel in the conventional image are replaced with a vector having intensity information of the light at different wavelengths, and thus the hyper spectrum image of the scene with a high resolution is a data block. In addition of the two spatial dimensions x and y, a spectrum dimension $\lambda$ is added into the spectrum data of the scene. With reference to the fact that the spectral resolution of the scene is determined by the number and continuity of the spectrum channels, the related sampling methods are classified into the multi-spectrum sampling and the hyper spectrum sampling (generally, the multi-spectrum sampling covers the infrared region and has a small number of narrow spectrum channels, however, the hyper spectrum sampling refers to the continuous and multichannel sampling in the visible range). Recently, the hyper spectrum imaging of the scene at a single time cannot meet the requirements of the research and application, and thus the hyper spectrum video sampling technology with a high resolution has been developed continuously. The sampled data expended from the spatial dimension to the spectrum dimension, and further to the time dimension. In other words, in addition of the spatial dimensions x, y and the spectrum dimension $\lambda$, a time dimension t is added into the spectrum data. Thus, the spectrum data of the dynamic scene can be captured and recorded in real time.

Due to a high dimension of the hyper spectrum video with the high resolution itself, it is hard to directly capture the hyper spectrum video with the high resolution. Thus, there is a need to propose a method for sampling the spectrum video information with the high resolution.

BRIEF SUMMARY OF THE INVENTION

Embodiments of the present disclosure seek to solve at least one of the problems existing in the prior art to at least some extent.

For this, an objective of the present disclosure is to provide a method for transmitting spectrum information.

According to embodiments of the present disclosure, a method for transmitting spectrum information is provided.

The method includes: sampling a first video of a scene by a first sampling device and sampling a spectrum video of a sampling point in the scene by a second sampling device, and processing the spectrum video to obtain a spectrum information of the sampling point; calculating estimated transmission ratio coefficients of the spectrum video according to color integral curves of the first sampling device; estimating a location of the sampling point in each frame of the first video; and transmitting the spectrum information of the sampling point to a plurality of scene points in the first video according to the estimated transmission ratio coefficients and the location of the sampling point in each frame of the spectrum video through a trilateral filtering algorithm.

In some embodiments, transmitting the spectrum information of the sampling point to a plurality of scene points in the first video includes: transmitting the spectrum information in a spatial domain, a time domain and a color domain respectively.

In some embodiments, the method further includes setting parameters for filters used in the trilateral filtering algorithm.

In some embodiments, the parameters include a spatial distance, a time difference and a color difference.

In some embodiments, the estimated transmission ratio coefficients include an estimated transmission ratio coefficient in a spectrum red-channel, an estimated transmission ratio coefficient in a spectrum green-channel and an estimated transmission ratio coefficient in a spectrum blue-channel.

In some embodiments, the first sampling device is a RGB camera and the second sampling device is a sampling device based on masking-out and dispersion.

In some embodiments, the first video has a high spatial resolution and a low spectral resolution, and the spectrum video has a low spatial resolution and a high spectral resolution.

In some embodiments, the estimated transmission ratio coefficients are calculated according to following formulas:

$$w_\lambda^r = \frac{\text{response}_\lambda^r}{\text{response}_\lambda^r + \text{response}_\lambda^g + \text{response}_\lambda^b}$$

-continued $$w_\lambda^g = \frac{response_\lambda^g}{response_\lambda^r + response_\lambda^g + response_\lambda^b}$$

$$w_\lambda^b = \frac{response_\lambda^b}{response_\lambda^r + response_\lambda^g + response_\lambda^b}$$

where, $response_\lambda^r$ is a strength value of a red integral curve of the RGB camera at a spectral wavelength $\lambda$, $response_\lambda^g$ is a strength value of a green integral curve of the RGB camera at the spectral wavelength $\lambda$, $response_\lambda^b$ is a strength value of a blue integral curve of the RGB camera at the spectral wavelength $\lambda$, $w_\lambda^r$ is the estimated transmission ratio coefficient at the spectral wavelength $\lambda$ when the spectrum information is transmitted in the spectrum red-channel, $w_\lambda^g$ is the estimated transmission ratio coefficient at the spectral wavelength $\lambda$ when the spectrum information is transmitted in the spectrum green-channel, and $w_\lambda^b$ is the estimated transmission ratio coefficient at the spectral wavelength $\lambda$ when the spectrum information is transmitted in the spectrum blue-channel.

With the method according to embodiments of the present disclosure, the spectrum information of the sampling point is transmitted to the scene with a high resolution through the trilateral filtering algorithm, thus obtaining a video with a high spatial resolution and a high spectral resolution.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
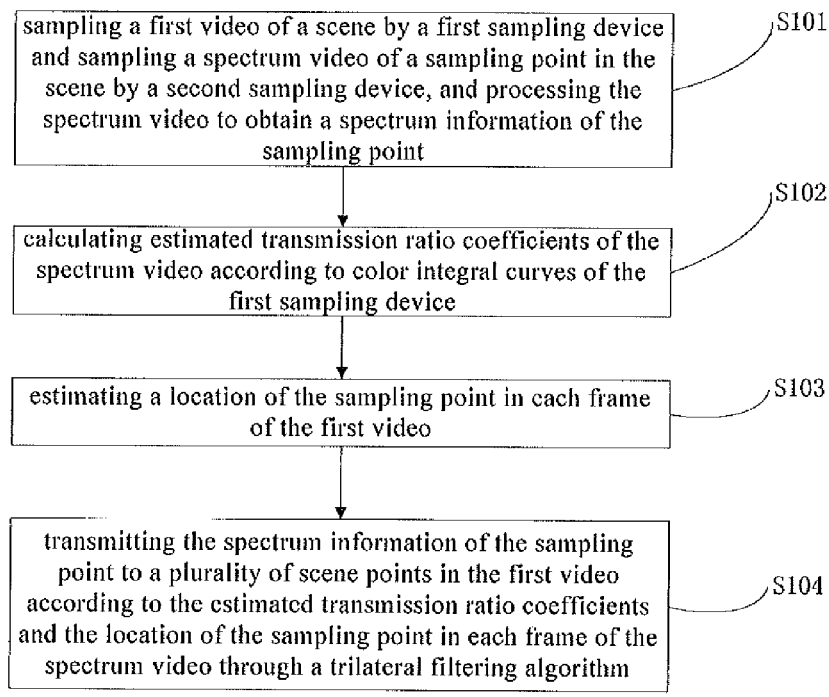
FIG. 1 is a flow chart of a method for transmitting spectrum information according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

FIG. 1 is a flow chart of a method for transmitting spectrum information of an embodiment of the present disclosure. As shown in FIG. 1, the method for transmitting spectrum information includes the following steps.

At step 101, a first video of a scene is sampled by a first sampling device and a spectrum video of a sampling point in the scene is sampled by a second sampling device, and then the spectrum video is further processed to obtain spectrum information of the sampling point.

Specifically, in some embodiment of the present disclosure, the first video of the scene is sampled by a RGB camera and has a high spatial resolution (such as 1024×768) and a low spectral resolution (such as only RGB channels). The spectrum video of the sampling point in the scene is sampled by a sampling device based on masking-out and dispersion and has a low spatial resolution (such as less than one thousand) and a high spectral resolution (such as 61 channels).

In one embodiment of the present disclosure, a scene light of the first video of the scene is gathered and transmitted by an imaging objective device to form a transmitted light, and the scene light is spatially sampled by a sampling mask device. The transmitted light is illuminated on a prism beam-splitting device behind the imaging subjective device to be dispersed into a plurality of spectrums having different wavelengths, and then the plurality of spectrums are imaged by a camera behind the prism beam-splitting device to form the image to be calibrated. Subsequently, the sampling point of the image are calibrated and corrected by a spectrum sampling and calibrating device to obtain the spectrum information of the sampling point in the first video of the scene. Then, the spectrum information of the sampling point is calibrated in the spectrum video of the scene to achieve the calibration of the spectrum information of the sampling point.

At step 102, estimated transmission ratio coefficients of the spectrum video are calculated according to color integral curves of the first sampling device. The estimated transmission ratio coefficients include an estimated transmission ratio coefficient in a spectrum red-channel, an estimated transmission ratio coefficient in a spectrum green-channel and an estimated transmission ratio coefficient in a spectrum blue-channel.

Figure 2:
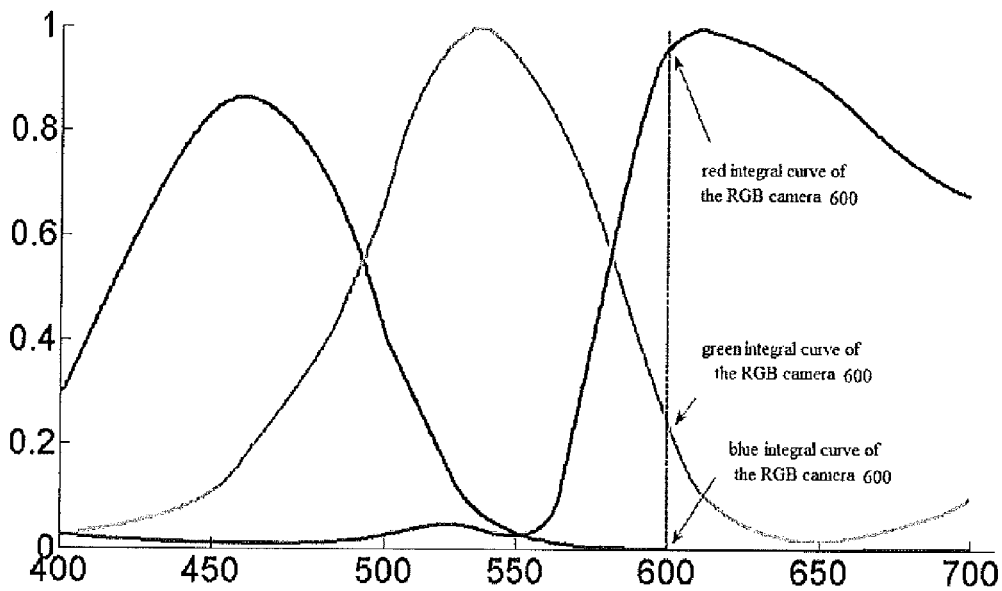
FIG. 2 is a schematic diagram of estimated transmission ratio coefficients of the spectrum video according to an embodiment of the present disclosure.

In an embodiment of the present disclosure, the estimated transmission ratio coefficients are calculated according to following formulas:

$$w_\lambda^r = \frac{response_\lambda^r}{response_\lambda^r + response_\lambda^g + response_\lambda^b}$$

$$w_\lambda^g = \frac{response_\lambda^g}{response_\lambda^r + response_\lambda^g + response_\lambda^b}$$

$$w_\lambda^b = \frac{response_\lambda^b}{response_\lambda^r + response_\lambda^g + response_\lambda^b}$$

where, $response_\lambda^r$ is a strength value of a red integral curve of the RGB camera at a spectral wavelength $\lambda$, $response_\lambda^g$ is a strength value of a green integral curve of the RGB camera at the spectral wavelength $\lambda$, $response_\lambda^b$ is a strength value of a blue integral curve of the RGB camera at the spectral wavelength $\lambda$, $w_\lambda^r$ is the estimated transmission ratio coefficient at the spectral wavelength $\lambda$ when the spectrum information is transmitted in the spectrum red-channel, $w_\lambda^g$ is the estimated transmission ratio coefficient at the spectral wavelength $\lambda$ when the spectrum information is transmitted in the spectrum green-channel, and $w_\lambda^b$ is the estimated transmission ratio coefficient at the spectral wavelength $\lambda$ when the spectrum information is transmitted in the spectrum blue-channel. FIG. 2 shows estimated transmission ratio coefficients of the spectrum video according to an embodiment of the present disclosure.

At step 103, a location of the sampling point in each frame of the first video is estimated.

Specifically, since the spectrum video is obtained from capturing a dynamic scene, the location of the sampling point is required to be estimated when the spectrum information is transmitted to the video frames at different time. In one embodiment of the present disclosure, an optical flow method is used to estimate the location of the sampling point. The optical flow refers to a manifestation of the relative motion between the observer and the scene in the visual scene. Specifically, the relative motion of objects in space results in a corresponding change of a gray level distribution of the image, and a manifestation of a motion field of the object in an image sequence is the optical flow field, i.e., an instantaneous velocity field of a pixel in a plan gray level image. The Lucas-Kanade method is a commonly used optical flow method. In some embodiments of the present disclosure, the Lucas-Kanade method is adopted to estimate the inter-frame motion of the sampling point, such that the location of the sampling point in each frame of the first video can be estimated.

At step 104, the spectrum information of the sampling point is transmitted to a plurality of scene points in the first video according to the estimated transmission ratio coefficients and the location of the sampling point in each frame of the spectrum video through a trilateral filtering algorithm.

Specifically, the spectrum information of the sampling point is transmitted in the spatial domain, the time domain and the color domain according to the estimated transmission ratio coefficients and the location of the sampling point in each frame of the spectrum video. Furthermore, before transmitting the spectrum information of the sampling point to a plurality of scene points in the first video, parameters for filters used in the trilateral filtering algorithm are set, in which the parameters include a spatial distance, a time difference and a color difference.

In one embodiment of the present disclosure, the spectrum information is transmitted to the spectrum video according to the spectrum consistency between adjacent pixels, the relevance between the estimated transmission ratio coefficients of the spectrum video and the spectrum, the spectrum time continuity between adjacent video frames and the continuity of the spectrum information in the spatial domain, the time domain and the color domain. Parameters for each filter used in the trilateral filtering algorithm can be changed according to different requirements of the spatial domain, the time domain and the color domain.

Figure 3:
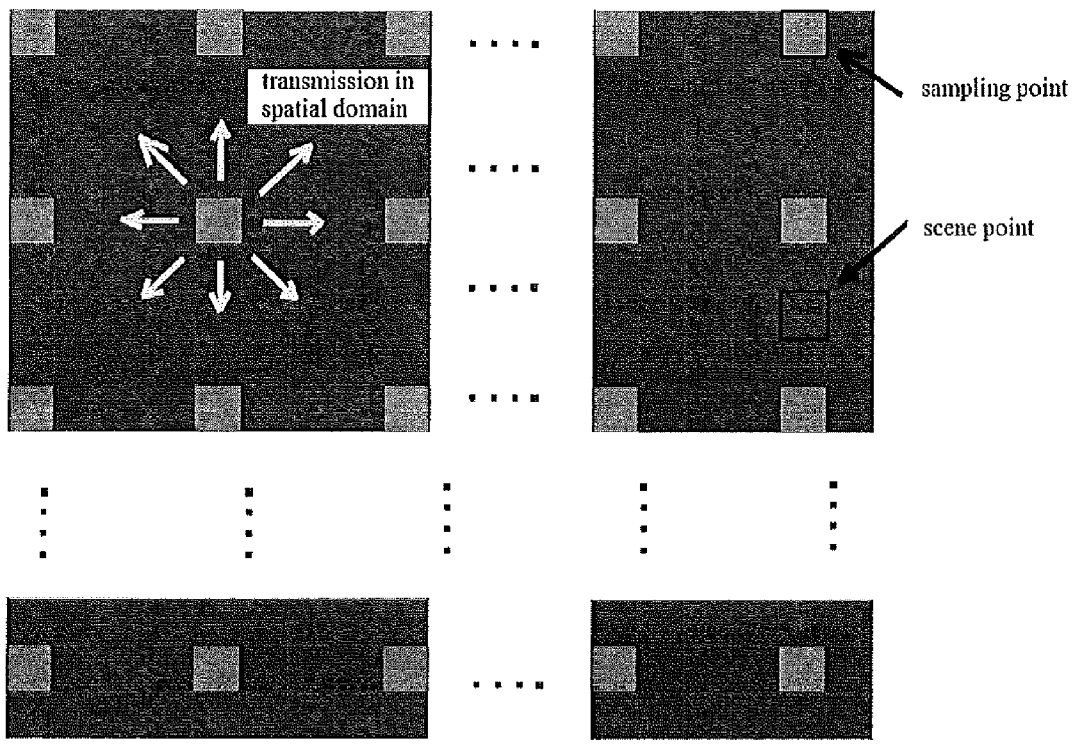
FIG. 3 is a schematic diagram of a spatial domain transmission according to an embodiment of the present disclosure.
Figure 4:
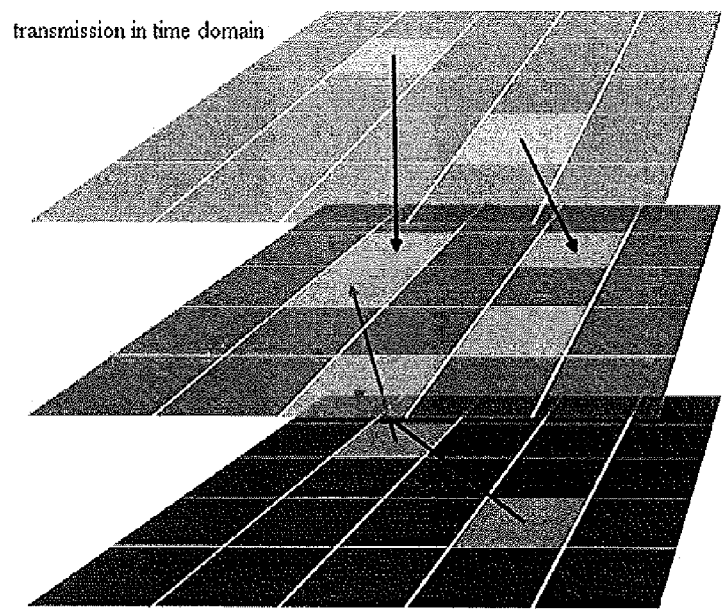
FIG. 4 is a schematic diagram of a time domain transmission according to an embodiment of the present disclosure.

FIG. 3 is a schematic diagram of a spatial domain transmission according to an embodiment of the present disclosure. FIG. 4 is a schematic diagram of a time domain transmission according to an embodiment of the present disclosure. As shown in FIGS. 3 and 4, the method for transmitting spectrum information based on the trilateral filtering algorithm can be presented by the following formulas:

$$\rho_k^C = \frac{C_{ij}}{C_k}, C \in \{R, G, B\}$$

$$ms_{ij} = \sum_{C \in \{R,G,B\}} \frac{\sum_{k \in Neigh} G_{\sigma_r}(d_k^C) \cdot G_{\sigma_s}(d_k^{xy}) \cdot G_{\sigma_t}(d_k^t) \cdot \rho_k^C \cdot ms_k^C}{\sum_{k \in Neigh} G_{\sigma_r}(d_k^C) \cdot G_{\sigma_s}(d_k^{xy}) \cdot G_{\sigma_t}(d_k^t)},$$

$$C \in \{R, G, B\}$$

Where, $ms_{ij}$ is a spectrum value of the pixel having a spatial coordinate $(i, j)$; $G_\sigma( )$ is a Gaussian kernel function having a mean value 0 and a variance $\sigma$, $\sigma_r$ is the variance of the Gaussian kernel function in the color domain, $\sigma_s$ is the variance of the Gaussian kernel function in the spatial domain, $\sigma_t$ is the variance of the Gaussian kernel function in the time domain, Neigh is a range of the sampling point k, and may contain sampling points having a spatial distance no more than $3\sigma_r$ away from the objective point $(i, j)$ and a time distance no more than $3\sigma_t$ away from the objective point $(i, j)$ according to characteristics of the Gaussian function (thus simplifying the calculation), $d_k^C$ is a distance in the color domain between the objective point $(i, j)$ and the sampling point k, $d_k^{xy}$ is a distance in the spatial domain between the objective point $(i, j)$ and the sampling point k, $d_k^t$ is a distance in the time domain between the objective point $(i, j)$ and the sampling point k, $\rho_k^C$ is a spectrum difference between different pixels, $ms_k^C$ is a value of the spectrum information of the sampling point transmitted in the red, green or blue channel and the calculation formula of the $ms_k^C$ is: $ms_k^C = ms_k(x) w_\lambda^C$, $C \in \{R,G,B\}$, where $w_\lambda^C$ is an estimated transmission ratio coefficient of the spectrum sub-channel.

With the method according to embodiments of the present disclosure, the spectrum information of the sampling point is transmitted to the scene with a high resolution through the trilateral filtering algorithm, thus obtaining a video with a high spatial resolution and a high spectral resolution.

Reference throughout this specification to an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

The invention claimed is:

1. A method for transmitting spectrum information, comprising:
   sampling a first video of a scene by a first sampling device and sampling a spectrum video of a sampling point in the scene by a second sampling device, and processing the spectrum video to obtain spectrum information of the sampling point;
   calculating estimated transmission ratio coefficients of the spectrum video according to color integral curves of the first sampling device;
   estimating a location of the sampling point in each frame of the first video; and
   transmitting the spectrum information of the sampling point to a plurality of scene points in the first video according to the estimated transmission ratio coefficients and the location of the sampling point in each frame of the spectrum video through a trilateral filtering algorithm.

2. The method according to claim 1, wherein transmitting the spectrum information of the sampling point to a plurality of scene points in the first video comprises:
transmitting the spectrum information in a spatial domain, a time domain and a color domain respectively.

3. The method according to claim 1, further comprising:
setting parameters for filters used in the trilateral filtering algorithm.

4. The method according to claim 3, wherein the parameters comprise a spatial distance, a time difference and a color difference.

5. The method according to claim 1, wherein the estimated transmission ratio coefficients comprise an estimated transmission ratio coefficient in a spectrum red-channel, an estimated transmission ratio coefficient in a spectrum green-channel and an estimated transmission ratio coefficient in a spectrum blue-channel.

6. The method according to claim 1, wherein the first sampling device is a RGB camera and the second sampling device is a sampling device based on masking-out and dispersion.

7. The method according to claim 1, wherein the first video has a high spatial resolution and a low spectral resolution, and the spectrum video has a low spatial resolution and a high spectral resolution.

8. The method according to claim 5, wherein the estimated transmission ratio coefficients are calculated according to following formulas:

$$w_\lambda^r = \frac{\text{response}_\lambda^r}{\text{response}_\lambda^r + \text{response}_\lambda^g + \text{response}_\lambda^b}$$

$$w_\lambda^g = \frac{\text{response}_\lambda^g}{\text{response}_\lambda^r + \text{response}_\lambda^g + \text{response}_\lambda^b}$$

$$w_\lambda^b = \frac{\text{response}_\lambda^b}{\text{response}_\lambda^r + \text{response}_\lambda^g + \text{response}_\lambda^b}$$

where, $\text{response}_\lambda^r$ is a strength value of a red integral curve of the RGB camera at a spectral wavelength $\lambda$, $\text{response}_\lambda^g$ is a strength value of a green integral curve of the RGB camera at the spectral wavelength $\lambda$, $\text{response}_\lambda^b$ is a strength value of a blue integral curve of the RGB camera at the spectral wavelength $\lambda$, $w_\lambda^r$ is the estimated transmission ratio coefficient at the spectral wavelength $\lambda$ when the spectrum information is transmitted in the spectrum red-channel, $w_\lambda^g$ is the estimated transmission ratio coefficient at the spectral wavelength $\lambda$ when the spectrum information is transmitted in the spectrum green-channel, and $w_\lambda^b$ is the estimated transmission ratio coefficient at the spectral wavelength $\lambda$ when the spectrum information is transmitted in the spectrum blue-channel.

\* \* \* \* \*